(12) United States Patent
Tabara (10) Patent No.: US 6,179,044 B1
(45) Date of Patent: Jan. 30, 2001

(54) VEHICLE AIR-CONDITIONING DEVICE (75) Inventor: Hiroyuki Tabara, Kariya (JP)

(73) Assignee: Denso Corporation, Kariya (JP)

( * ) Notice: Under 35 U.S.C. 154(b), the term of this patent shall be extended for 0 days.

(21) Appl. No.: 08/989,279

(22) Filed: Dec. 12, 1997

(30) Foreign Application Priority Data

Dec. 24, 1996 (JP) .................................................. 8-342278
Nov. 11, 1997 (JP) .................................................. 9-309002

(51) Int. Cl.[7] ........................................................ B60H 3/00
(52) U.S. Cl. ................................ 165/42; 165/43; 62/244; 236/13
(58) Field of Search ......................... 165/42, 43; 236/13, 236/91 C, 49; 62/244

(56) References Cited

U.S. PATENT DOCUMENTS

| 4,470,270 | * | 9/1984 | Takada et al. | 165/42 |
| 4,834,170 | * | 5/1989 | Saurada et al. | 165/43 |
| 4,856,710 | * | 8/1989 | Takada et al. | 165/43 |
| 5,042,566 | * | 8/1991 | Hildebrand | 165/42 |
| 5,167,129 | * | 12/1992 | Akasaka | 165/43 |
| 5,186,237 | * | 2/1993 | Adasek et al. | 165/43 |
| 5,316,074 | * | 5/1994 | Isaji et al. | 165/43 |
| 5,531,264 | * | 7/1996 | Eike et al. | 165/43 |
| 5,582,236 | * | 12/1996 | Eike et al. | 165/43 |
| 5,803,166 | * | 9/1998 | Ito et al. | 165/42 |
| 5,810,078 | * | 9/1998 | Knutsson et al. | 165/42 |

FOREIGN PATENT DOCUMENTS

| 58-4616 | * | 1/1983 | (JP) | 165/43 |
| 58-221714 | | 12/1983 | (JP) . | |
| 4-166413 | * | 6/1992 | (JP) | 165/43 |

* cited by examiner

Primary Examiner—Ira S. Lazarus
Assistant Examiner—Terrell McKinnon
(74) Attorney, Agent, or Firm—Harness, Dickey & Pierce, PLC (57) ABSTRACT

A vehicle air-conditioning device with a rear air-conditioning unit does not having a temperature control device, yet prevents excessive hot air blow temperatures when the fan blow is low. A heat exchanger for heating the air blow from the blower is installed in the case of the air-conditioning unit at the rear of a dual air-conditioning type vehicle air-conditioning device along with a cooling air bypass path to allow cool air to bypass the heat exchanger. A cool air bypass door is installed in the cool air bypass path to open and close it as needed. When the blower is set in low speed mode and hot air heated by the heat exchanger is blown out from the blow path in foot mode, the cool air bypass door is set to a position to open the cool air bypass path in a process that mixes cool air and warm air in the blow path and lowers the temperature of the hot air.

13 Claims, 8 Drawing Sheets

(FACE MODE, FAN SPEED ARBITRARY)

FIG. 6

(FOOT MODE, FAN SPEED HIGH OR INTERMEDIATE)

FIG. 7

(FACE MODE, FAN SPEED ARBITRARY)

FIG. 8A

(FOOT MODE, FAN SPEED HIGH OR INTERMEDIATE)

FIG. 8B (FOOT MODE, FAN SPEED LOW)

(FACE MODE, FAN SPEED ARBITRARY)

FIG. 10A

(FOOT MODE, FAN SPEED HIGH OR INTERMEDIATE)

FIG. 10B (FOOT MODE, FAN SPEED LOW)

FIG. 10C

VEHICLE AIR-CONDITIONING DEVICE

CROSS-REFERENCE TO RELATED APPLICATION

This application is related to Japanese Patent Application No. Hei 8-342278 and Hei 9-309002, incorporated herein by reference.

BACKGROUND OF THE INVENTION

1. Field of the Invention

The present invention relates in general to a dual air conditioner type vehicle air-conditioning device installed at the front and rear inside a vehicle compartment and in particular to air-conditioning units at the vehicle rear, for instance, suited for use in vans.

2. Description of Related Art

Conventionally, vehicles with a long passenger compartment air space in the front and rear as, for instance, in vans, have an air-conditioning unit installed at the front near the instrument panel inside the passenger compartment and also an air-conditioning unit installed at the rear of the compartment to provide a pleasant environment inside the passenger compartment.

In such cases, the passengers do not normally ride in the rear seat in the passenger compartment, so the rear air-conditioning unit serves as supplementary equipment for passenger compartment air-conditioning and the front air-conditioning unit normally provides the main air-conditioning for the passenger compartment.

The rear air-conditioning unit therefore must not only have an extremely simple design and low cost but must also have a compact structure to allow installation in a small space at the rear of the passenger compartment.

A type of air-conditioning device with the front air-conditioning unit performing temperature control of the air for the entire interior passenger compartment and the rear air-conditioning unit not having a temperature control device (for example a mechanism of the mixed cooling type using an air mix door) in order to meet the need for a rear air-conditioning unit both simple and compact has been tested.

Consequently, in the foot mode of this type, when the fan is set to Lo mode (low speed mode) the hot air temperature becomes extremely high due because the fan speed is small and the inner air is suctioned. This high temperature air is forced upwards inside the passenger compartment causing the faces of the passengers to become hot and flushed and creating an undesirable warm air-conditioning sensation.

SUMMARY OF THE INVENTION

In view of the above, it is therefore an object of the present invention to provide a rear air-conditioning unit not having a temperature control device which nonetheless prevents excessive hot air temperatures when the fan speed is low.

The above object is achieved according to a first aspect of the present invention by providing a vehicle air-conditioning device with a rear air-conditioning unit which does not having a temperature control device, yet which prevents excessive hot air temperatures when the fan speed is low. A heat exchanger for heating the air from the blower is installed in the case of the air-conditioning unit at the rear of a dual air-conditioning type vehicle air-conditioning device along with a cooling air bypass path to allow cool air to bypass the heat exchanger. A cool air bypass door is installed in the cool air bypass path to open and close it as needed. When the blower is set in low speed mode and hot air heated by the heat exchanger is blown out from the blow path in foot mode, the cool air bypass door is set to a position to open the cool air bypass path in a process that mixes cool air and warm air in the blow path and lowers the temperature of the hot air.

The cool air bypass door may be provided upstream of the heat exchanger; alternatively, it may be provided downstream thereof.

Other objects and features of the present invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

Figure 1:
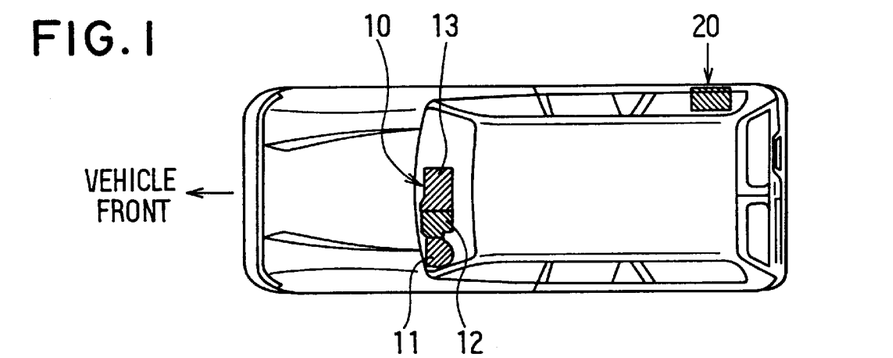
FIG. 1 is a layout drawing showing a dual air conditioner type vehicle air-conditioning device according to a first preferred embodiment of the present invention.

FIGS. 1–8 show a first preferred embodiment of the present invention. FIG. 1 shows the layout of the dual air conditioner type vehicle air-conditioning device of this embodiment. A front air-conditioning unit 10 is installed near the instrument panel at the front interior of the passenger compartment.

This front air-conditioning unit 10 is mainly for air-conditioning the inside of the passenger compartment and includes a blower unit 11 integrating an interior/exterior switching box, for switching air flow from interior air to exterior air, with a blower fan for blowing the interior or exterior air coming from the interior/exterior switching box, a cooler unit 12 having a cooling evaporator (cooling type heat exchanger) for cooling the air blow from the blower unit 11, and a heater unit 13 to reheat to a specified temperature the air cooled by the evaporator.

This heater unit 13 has a heater core for heating the air by using the coolant (heated water) from the vehicle engine as a heat source, a temperature regulator to adjust the amount of heat from the heater core and air temperature, and a mode switcher to switch air flow paths to the respective face, foot defroster outlets.

The temperature regulator may be either a device utilizing an air mixing method to control the mixture of warm air warmed from the heater core or may be a device utilizing a reheat method to control the warm water flow rate and water temperature for the water circulating in the heater core.

On the other hand, the rear air-conditioning unit at the rear of the passenger compartment interior is installed on the lower side of the side wall of the chassis or, for instance, on the floor at the rear of the passenger compartment interior. The rear air-conditioning unit 20 provides supplemental air-conditioning for the rear section of the passenger compartment when passengers are sitting in the rear seats while the vehicle is being driven.

Figure 2:
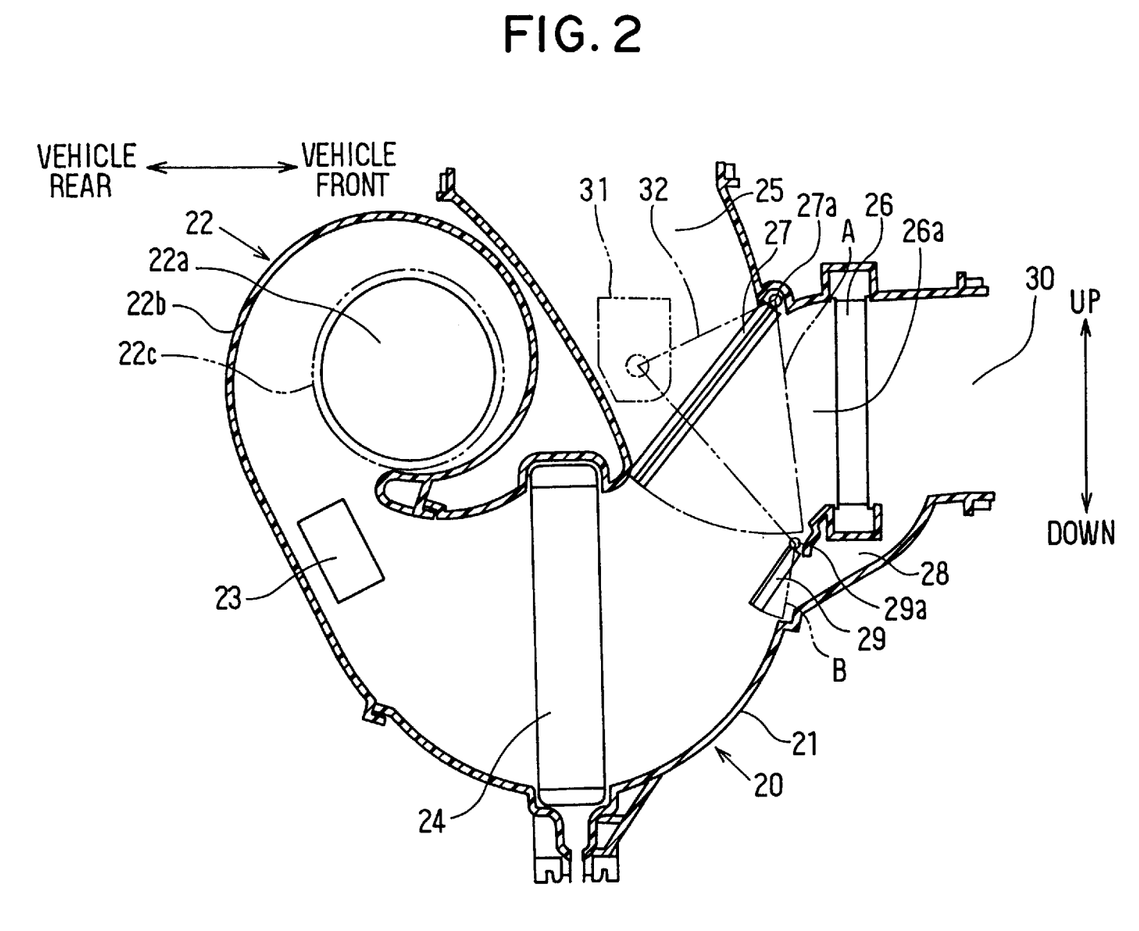
FIG. 2 is a cross-sectional view showing the rear air-conditioning unit of the first embodiment of this invention.

FIG. 2 shows the rear air-conditioning unit 20 having a case 21 forming an air passage. This case 21 has an elasticity comparable to that of polypropylene and is also a molded product of plastic having superior strength. This case 21 may, for instance, be formed of a plurality of case pieces joined into one integrated piece in the plane of the paper of FIG. 2 by a clamping device such as metal clips or screws.

A blower 22 is installed in the member farthest to the chassis rear. This blower 22 is comprised of a sirocco type fan 22a consisting of a multi-blade centrifugal fan driven by a motor (not shown). This fan 22a is housed inside a scroll case 22b.

The fan 22a and concentric disc-shaped inlet 22c are provided at the center of the side surface of the scroll case 22b. This inlet 22c opens directly into the passenger compartment interior. Accordingly, the interior air (passenger compartment air) is suctioned directly into the scroll case 22b by way of the inlet 22c.

Reference numeral 23 denotes the speed control resistor for the drive motor installed at the outlet of the air flow passage of the squirrel case 22b to be cooled by the air blow from the blower fan 22a. Reference numeral 24 denotes the cooling evaporator (cooling type heat exchanger) installed at the air flow outlet of the fan 22a in the case 21. The evaporator 24 cools the air blow by suctioning the generated and latent heat from the air blow in a refrigerant coolant cycle.

A face blow path 25 branches to face upward at a member downstream of the evaporator 24 in the case 21. This face blow path 25 connects to the face outlet (not shown) by means of a face duct (also not shown). The face blow outlet is positioned to blow cool air towards the heads of the passengers in the rear seat.

A heater core (heating type heat exchanger) 26 is installed at a position downstream of the branch point of the face blow path 25. The heater core 26 utilizes the coolant water (heated water) from the vehicle engine as a heat source to heat the air being blown. In this example, when the vehicle engine is operated, heated water is constantly circulated in the heater core 26 by the water pump of the vehicle engine and the heated water circuit of the heater core 26 is formed by this so-called water valve-less system.

A blow mode door 27 is installed to rotate on a rotating shaft 27a at the branch point of the face blow path 25. The inlet air path 26a to the heater core 26 and the face blow path 25 are opened and closed by means of the blow mode door 27.

A cold air bypass path 28 is formed as a gap of specified dimensions between the bottom of the case 21 and the bottom of the heater core 26. The cold air bypass path 28 is opened and closed by the cold air bypass door 29. The cold air bypass door 29 is rotatable centering on a rotating shaft 29a.

Downstream of the heat core 26, a foot blow path 30 is formed to allow a mixture of warm air passed through the heater core 26 and cold air passed through the cold air bypass path 28 to flow. The foot blow path 30 connects to a foot outlet by means of a foot duct (not shown). This foot outlet is installed at the lower section of the rear seat in the passenger compartment and blows warm air on the feet of passengers in the rear seat.

A servomotor 31 serves as a door drive actuator and is installed near the blow mode door 27 at the exterior of the case 21. The servomotor 31 drives the blow mode door 27 and the cold air bypass door 29 by means of a link mechanism 32 described in more detail in connection with FIGS. 5–7.

Figure 3:
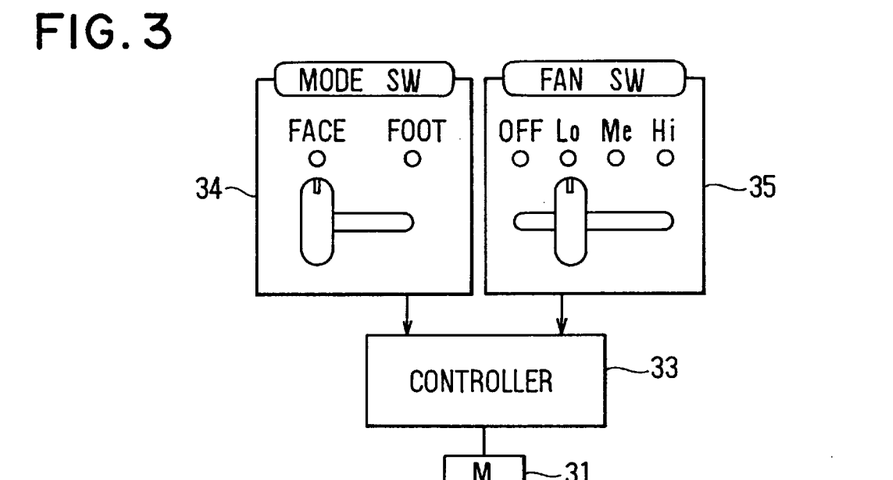
FIG. 3 is a block diagram showing the control circuit for the servomotor in FIG. 2.

The flow of electrical current to the servomotor 31 is regulated by a control circuit 33 as shown in FIG. 3. The control circuit 33 is provided with signals from a blow mode switch 34 and a fan switch 35 installed on the operating panel of the rear air-conditioning unit 20. The servomotor then moves to a drive angle as shown in FIG. 4 based on the signals from both of these switches 34 and 35 (in other words, blow mode and fan speed).

Figure 4:
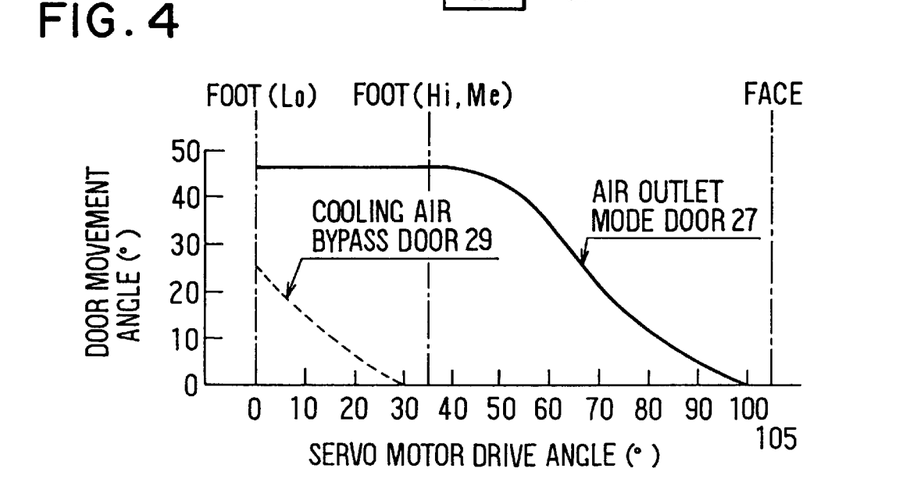
FIG. 4 is a graph showing drive characteristics of the servomotor in FIG. 2.
Figure 5:
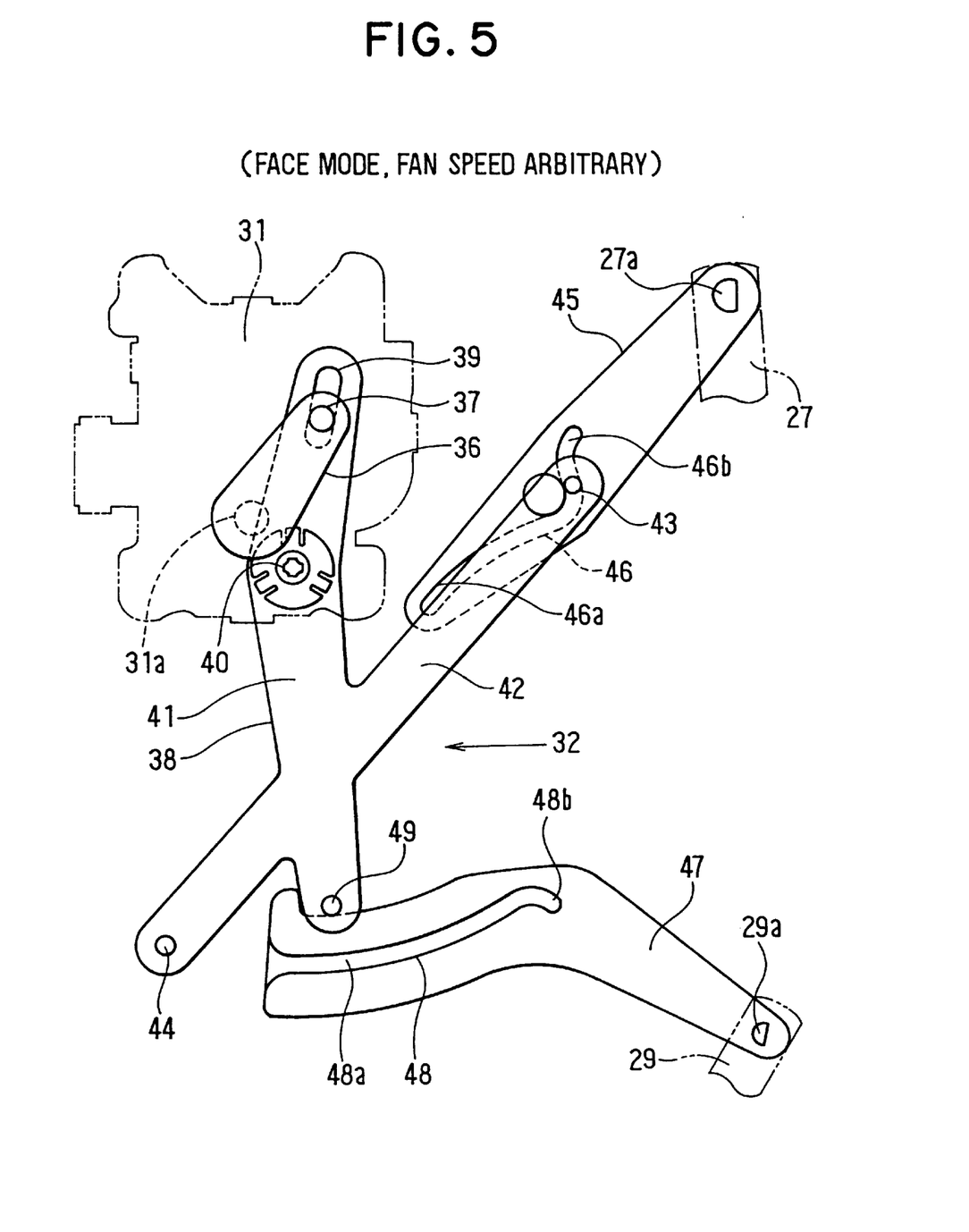
FIG. 5 is a descriptive drawing showing the link mechanism of the first embodiment of this invention and operating status during face mode.
Figure 6:
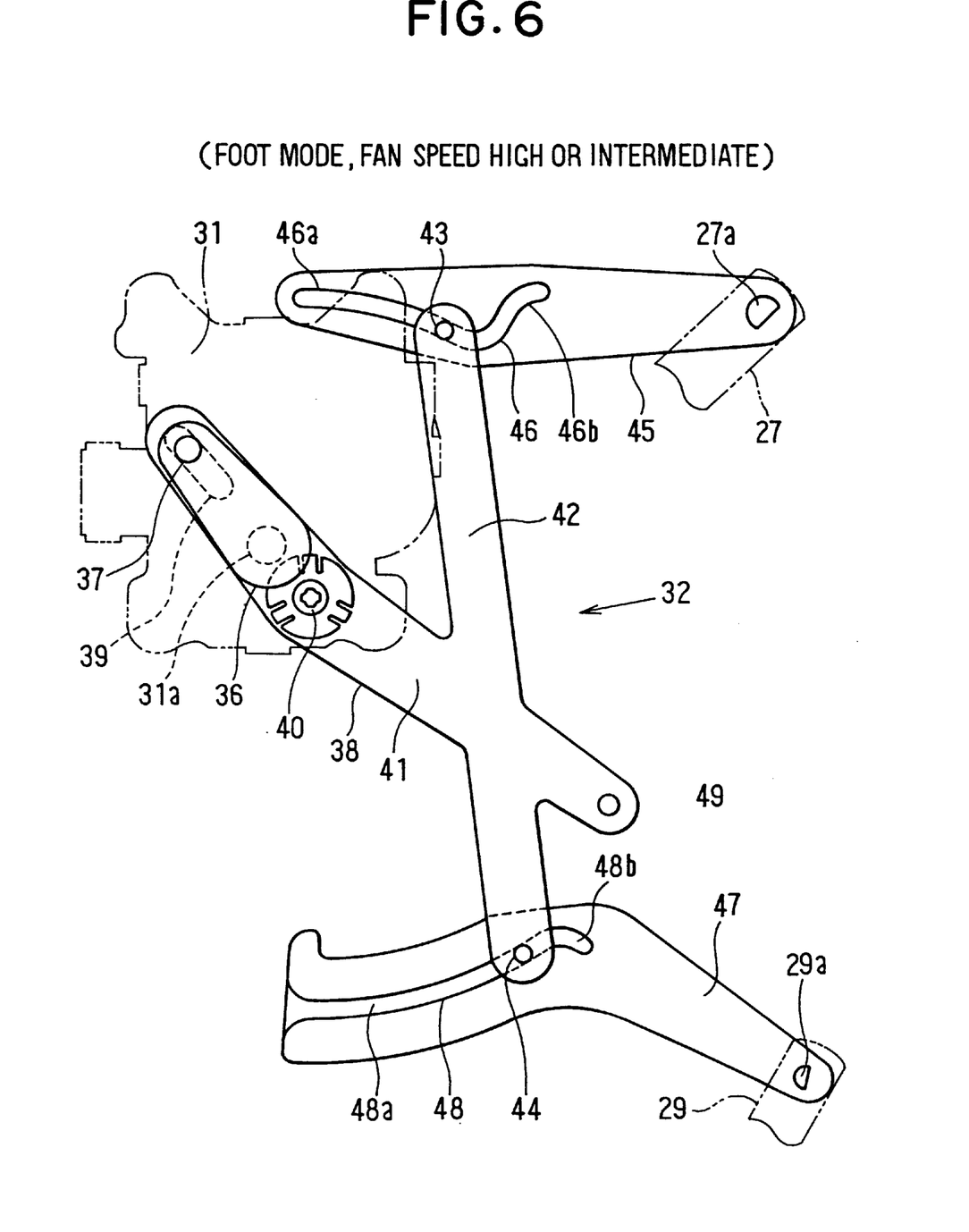
FIG. 6 is a descriptive drawing of the link mechanism of FIG. 5 showing the operation status in foot mode and also at medium and high fan speeds.
Figure 7:
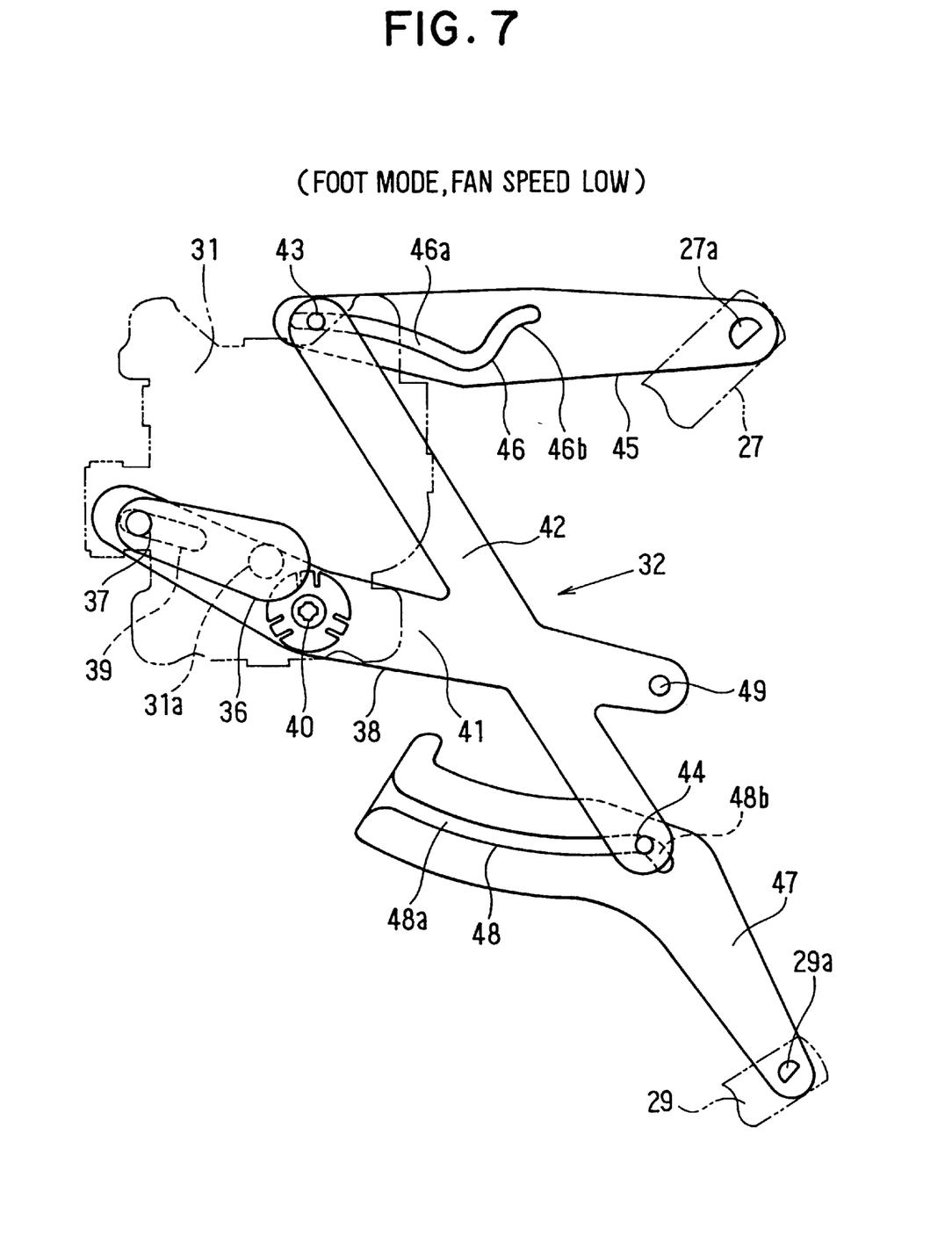
FIG. 7 is a descriptive drawing of the link mechanism of FIG. 5 showing the operation status in foot mode and when fan speed is low.

FIGS. 5–7 show specific examples of the structure of the link mechanism 32, and show the door movement angle corresponding to the servomotor drive angle in FIG. 4. A No. 1 link 36 connects to the output shaft 31a of the servomotor 31 and the No. 1 link 36 rotates along with the output shaft 31a. A pin 37 provided at the tip of the No. 1 link 36 is inserted in the stop groove 39 at one end of the No. 2 link 38 for sliding movement and connects the No. 1 link 36 with the No. 2 link 38.

The No. 2 link 38 is mounted to rotate centering on the rod 40. A lever 41 extends on the side opposite the stop groove 39 on the other side of the rod 40. A lever 42 intersects with the lever 41 in a diagonal direction and forms an integrated piece with the lever 41. Pins 43 and 44 are installed at opposite ends of the lever 42.

The rotating rod 27a of the blow mode door 27 connects to a No. 3 link 45 and a cam groove 46 is formed in the tip of this No. 3 link 45 for insertion by a pin 43 movable in the cam groove 46. The cam groove 46 includes a door groove 46b and an idle groove 46a forming an arc along the track of the pin 43 as shown in FIGS. 6 and 7. A No. 4 link 47 connects to a rod 29a of the cooling air bypass door 29, and a cam 48 is formed in the tip of the No. 4 link 47 for insertion and rotation by a pin 44. The cam groove 48 is formed by a door groove 48b and an idle groove 48a having an arc shape along the movement track of the pin 44 as shown in FIGS. 6 and 7. A pin 49 is installed in the tip of the lever 41.

The operation of the above structure is explained next. When set to face mode (FACE) by the blow mode switch 34, servomotor 31 angle is set to 105 degrees as shown in FIG. 4 regardless of the signal from the fan switch 35. This setting causes the control circuit 33 to set the blow mode door 27 and the cooling air bypass door 29 to set to a drive angle of 0 degrees by way of the link mechanism 32.

In other words, the link mechanism 32 assumes the position shown in FIG. 5 and the blow mode door 27 is moved to the dot-dash line position A, the face blow path 25 fully opens and the inlet air path 26a to the heater core 26 fully closes. The cold air bypass door 29 is moved to the 1 dot-dash line position B in FIG. 2 and the cooling air bypass path 28 is now fully closed. The pin 44 at this time, by means of the link mechanism, protrudes outside the cam groove 48 of the No. 4 link 47 as shown in FIG. 5 so that pin 49 contacts with the arc-shaped portion on the outer surface of the No. 4 link 47. The cold air bypass door 29 thus maintains the cooling air bypass path 28 in a fully closed position by the No. 4 link position.

Figure 8A:
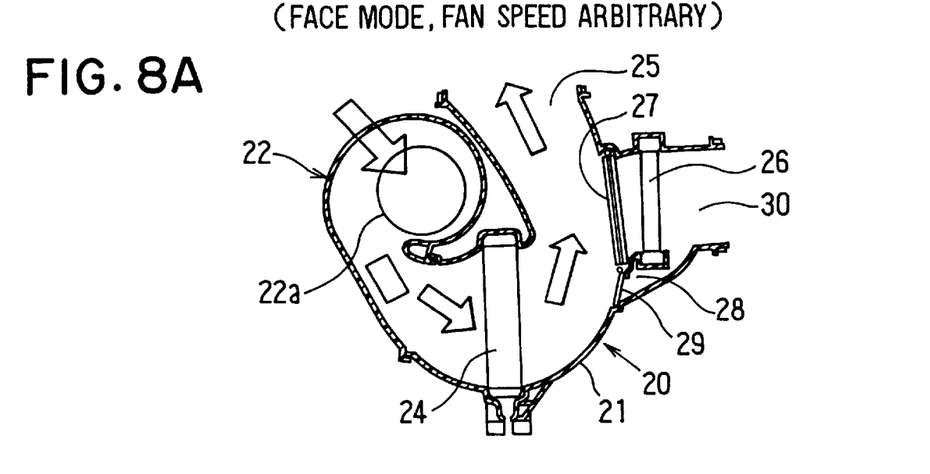
FIGS. 8A–8C are drawings illustrating the operation of the rear air-conditioning unit shown in FIG. 2.

The door position in face mode is shown in FIG. 8A. Here, after the air from the blower 22 is cooled by the evaporator 24, the cooled air is all made to flow to the face blow path 25, and after flowing from the face blow outlet by way of a face duct (not shown), blows onto the heads of the passengers sitting in the rear seat so that cooling of the rear seat area is performed. The blow rate of the cooling air can be switched to adjust the cooling performance by changing the blower 22 speed in the three steps of Lo (low speed) Me (medium speed) and Hi (high speed) by using the fan switch 35.

When the foot mode foot is set by means of the blow mode switch 34, the control circuit 33 provides variable control of the drive angle of the servomotor 31 shown in FIG. 4 by means of the fan switch 35.

In other words, in the foot mode, and when the fan switch 35 is set to the Me (medium speed) or Hi (high speed) position, the control circuit 33 sets the drive angle of the servomotor 31 to the 35 degree position shown in FIG. 4. This action sets the blow mode door 27 operation angle to 45 degrees by way of the link mechanism 32. The blow mode door 27 is set to the position shown by the solid line in FIG. 2. The face blow path 25 fully closes and the inlet air path 26a to the heater core 26 fully opens.

Figure 8B:
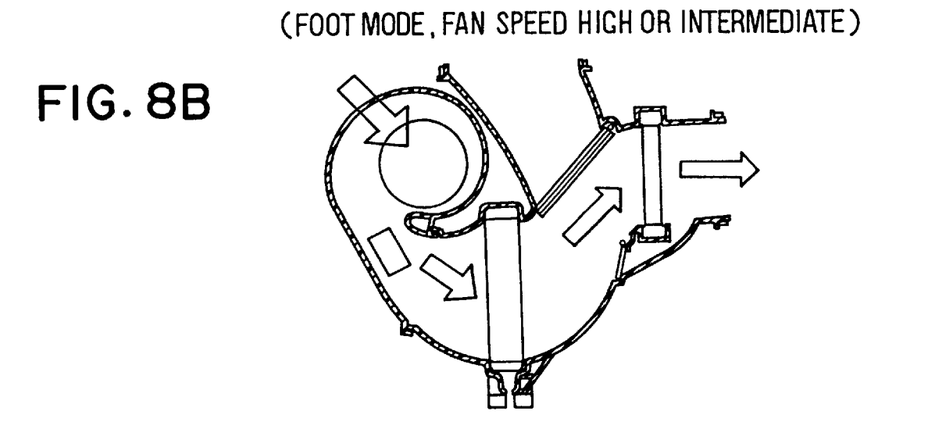

Conversely, the cooling air bypass door 29 operation angle is maintained at its previous angle of 0 degrees by the idle groove 48a of the No. 4 link 47 of link mechanism 32 as shown in FIG. 6. As a result, the cold air bypass door 29 is maintained at the dot-dash line position B in FIG. 2 and the cold air bypass path 28 is kept fully closed. The door position for this foot blow mode is shown in FIG. 8B.

Accordingly, after the air from the blower 22 has passed through the evaporator 24, this air then flows completely into the inlet air path 26a to the heater core 26 and is heated by the heater 26. Next, the foot blow path 30 blows this warm air by way of a foot duct (not shown) from the foot outlet to the feet of the passengers in the rear seat, and the rear seat area is thus warmed. At this time, the blow rate of the warm air can be switched to adjust the heating performance by changing the blower 22 speed in the three steps of Lo (low speed) Me (medium speed) and Hi (high speed) using the fan switch 35.

However, the rear air-conditioning unit 20 suctions the interior air in, and heats and blows out this air so that with the hot air blow method used to recirculate this interior air, when the blower 22 speed is set to Lo (low speed) and the minimum flow speed (for instance 100 m³/hour) is set after raising the inner air temperature, the problem of an excessive temperature rise of the warm air (for instance, 80° C.) may occur.

In this embodiment, in the foot mode with the fan switch 35 set to the Lo (low speed) position, the control circuit 33 determines the operating conditions and the control circuit 33 sets the drive angle of the servomotor to 0 degrees as shown in FIG. 4. At this time, the operating angle of the blow mode door 27 is still maintained at 45 degrees by the idle groove 46a of the No. 3 link 45 of the line mechanism 32. The blow mode door 27 maintains the position shown by the solid line in FIG. 2, the face blow mode path 25 fully closes completely and the inlet air path 26a to the heater core 26 is maintained in a fully open state.

However, on setting the operating angle of the cooling air bypass door 29 to 25 degrees, the cooling air bypass door 29 moves to the position of the solid line shown in FIG. 2 and the cooling air bypass path 28 opens. At this time, the cooling air bypass door 29 moves to a position roughly parallel with the inlet air path 26a to the heater core 26 so there is nothing to block the flow of air to the heater core 26.

Figure 8C:
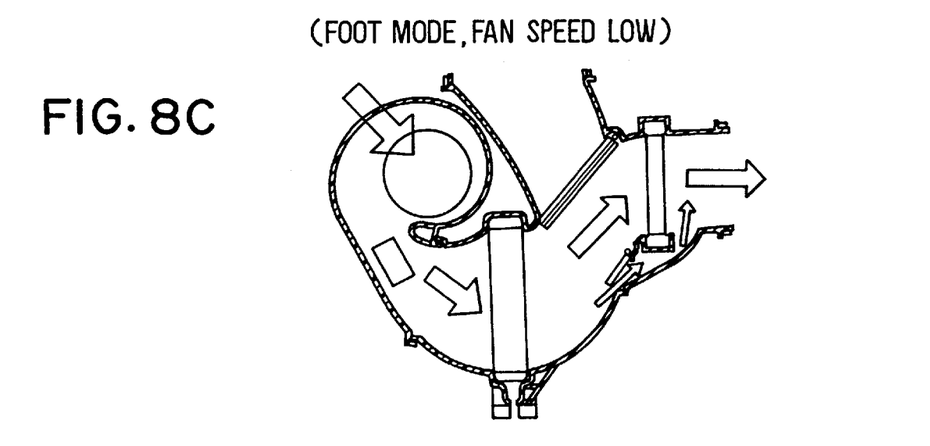

The opening of the cooling air bypass path 28 causes a portion of the air to bypass the heater core 26 as shown in FIG. 8C and flow into the foot blow path 30 so that the warm air heated by passing through the heater core is mixed in the foot blow path 30 with the cold air that bypassed the heater core so that the temperature of the warm air lowers. Consequently, an excessive temperature rise in the warm air temperature can be prevented at times when there is a low air in foot blow mode.

TABLE I below provides an operational summary of both of the above mentioned doors 27 and 29.

TABLE I

| BLOW MODE | FAN SWITCH | BLOW MODE DOOR 27 | | COOLING AIR BYPASS DOOR 29 | |
|---|---|---|---|---|---|
| | | FACE | FOOT | CLOSED | OPEN |
| Face | Off | ✓ | | — | — |
| Face | Lo | ✓ | | ✓ | |
| Face | Med | ✓ | | ✓ | |
| Face | Hi | ✓ | | ✓ | |
| Foot | Off | | ✓ | — | — |
| Foot | Lo | | ☑ | | ☑ |
| Foot | Med | | ✓ | ✓ | |
| Foot | Hi | | ✓ | ✓ | |

(Second Embodiment)

A second preferred embodiment of the present invention is shown in FIGS. 9 and 10A–10C in which the position of the cold air bypass door 29 has been changed from the position in the first embodiment.

In other words, in the first embodiment, the cooling air bypass door 29 is installed on the front side (air upstream side) of the heater core 26, and when the cooling air bypass door 29 opens the cooling air bypass path 28, as shown in FIG. 8C, the cold air bypass door 29 is moved to a position parallel with the inlet air path 26a to the heater core 26. Therefore, in order to prevent an excessive warm air temperature rise when the low air blows in foot blow mode, a certain amount of cooling air bypass must be maintained in the air flowing through the cooling air bypass path 28, making it necessary to increase the surface area for the opening of the bypass path 28.

Figure 9:
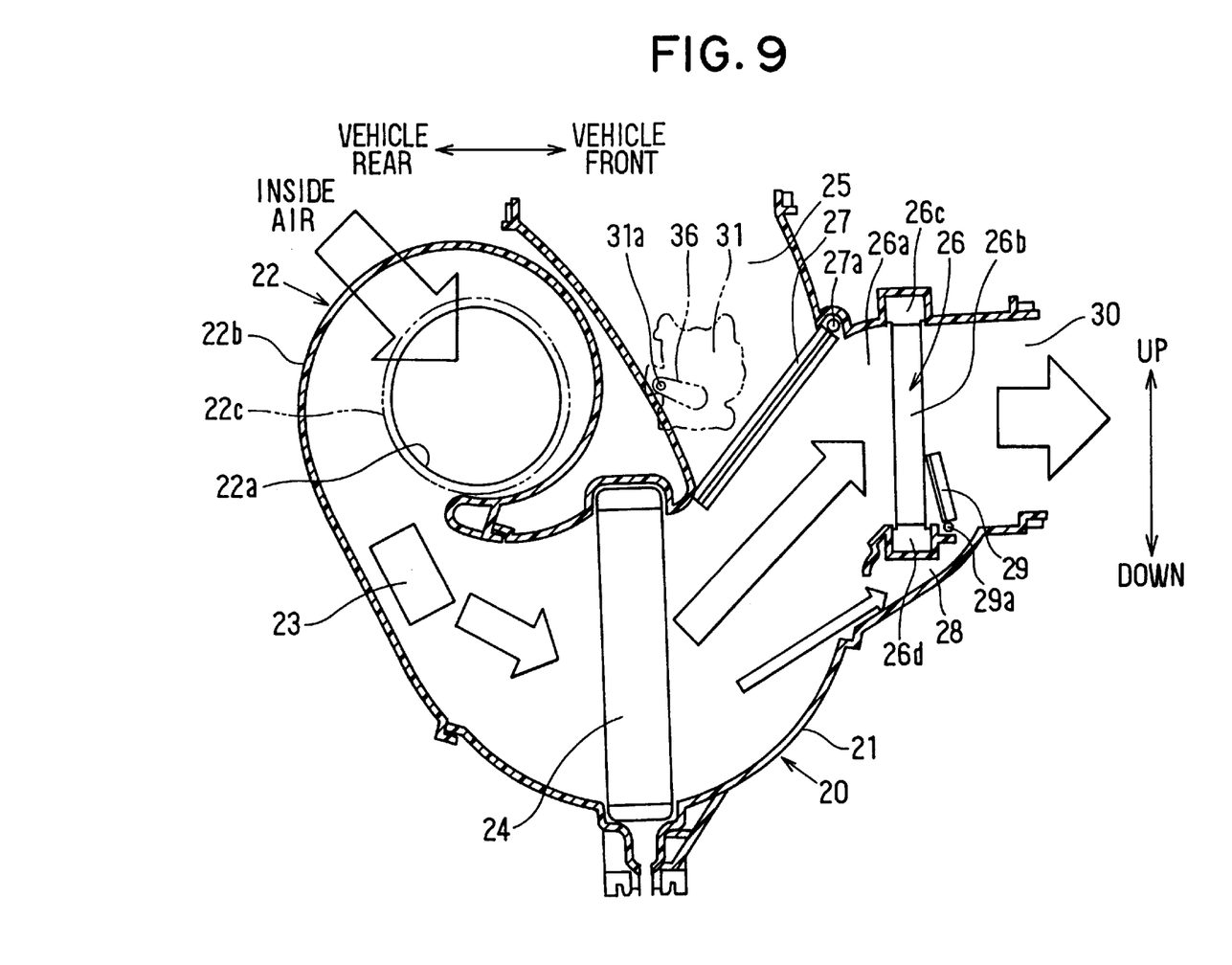
FIG. 9 is a cross sectional view showing the rear air-conditioning unit of a second preferred embodiment of the present invention.
Figure 10A:
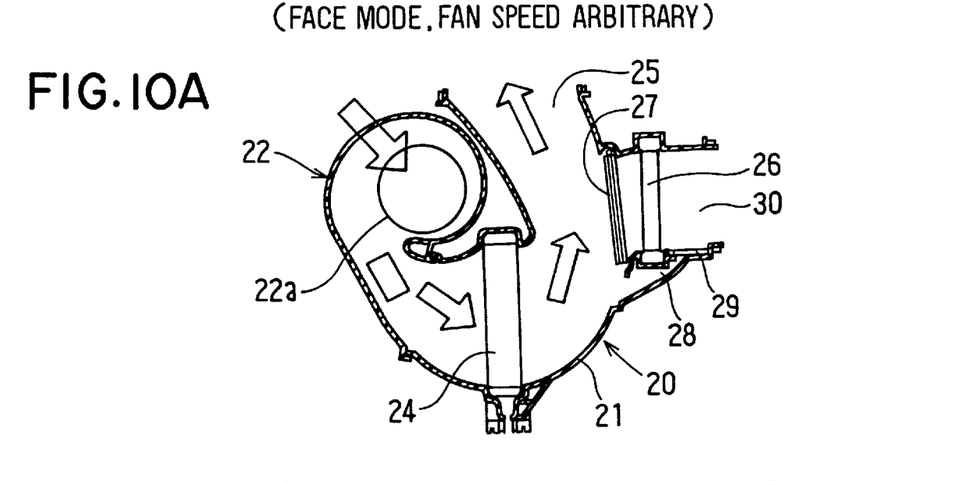
FIGS. 10A–10C are drawings illustrating the operation of the rear air-conditioning unit of the second embodiment.
Figure 10B:
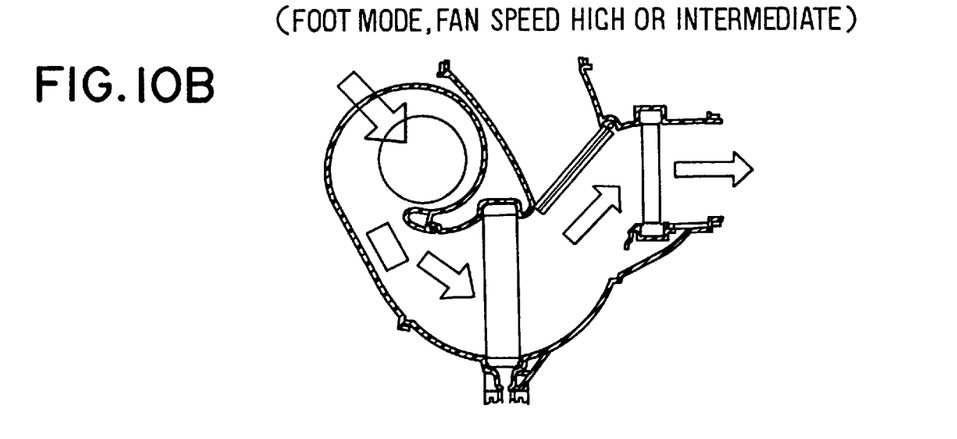
Figure 10C:
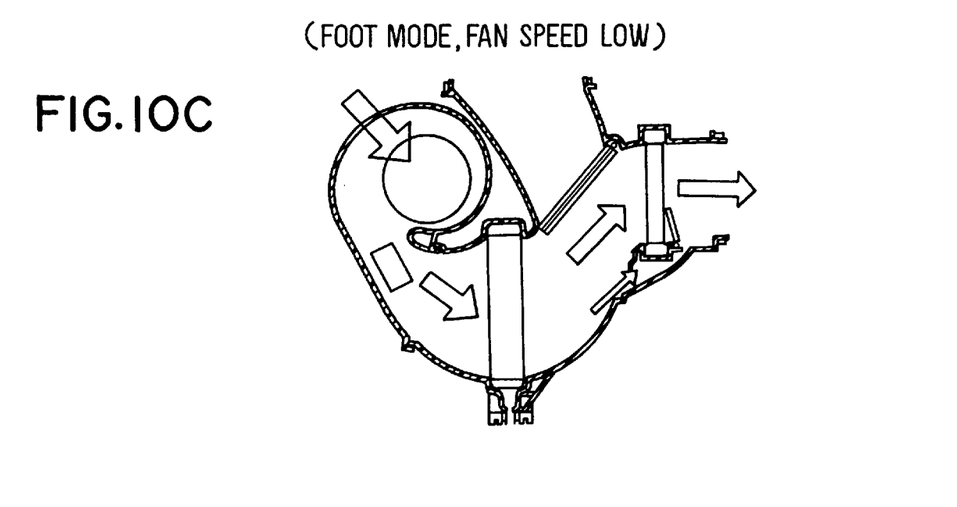

As shown in FIG. 9, in the second embodiment, the installation position of the cooling air bypass path door 29 has been changed to the rear side (downstream air flow side) of the heater core 26, as shown in FIG. 10C, when the cooling air bypass door 29 opens the cooling air bypass path 28, a portion of the heat exchanger core 26b of the heater core 26 is closed.

The heat exchanger core 26b of the heater core 26 referred to here is a flat tube (not shown) through which warm water from the vehicle engine flows, joined together with a corrugated fin (not shown). Tank sections 26c and 26d are installed at both ends of the heater exchange core 26b in order to distribute and collect warm water for the core section 26b. A portion of the heat exchange surface area of this kind of core 26b is closed off by the cooling air bypass door 29.

The blocking of a portion of the core 26b eliminates the need to enlarge the surface area of the opening of the cooling air bypass path 28 when there is low air blowing in foot mode (heating performance should be lowered) and allows lowering the temperature of the air blow on the passengers in the rear seat in the passenger compartment to a more pleasant level.

Conversely, when the foot blow to medium or high air blow (when heating performance should be increased) as shown in FIG. 10B, the cooling air bypass door 29 not only closes the cooling air bypass path 28 but also fully opens up the heat exchange surface are of the core section 26b of the heater core 26 to attain maximum heating performance.

FIGS. 10A–10C show the respective operating status of each mode of doors 27 and 29 in the second embodiment. The drive structure of both of these doors 27 and 29 may be completely the same as the first embodiment, so there explanation is omitted here.

(Variations)

In the above embodiments, the rear air-conditioning unit 20 had a heating type heater core 26 and a cooling type evaporator 24; however this invention can of course still be implemented even without providing a cooling type evaporator 24.

Further, in the above-described embodiments, the fan switch 35 was only set to Lo (low speed) position during foot mode and the cooling air bypass door 29 set to a position to open the cold air bypass path 28; however the cooling air bypass door 29 may be set to a position to open the cooling air bypass path 28 even with the fan switch 35 set to Me (medium speed) position.

Restated, the "blower 22 low speed mode" in this invention refers to an operating mode where the amount of air flow is not more than a specified amount compared to Hi (high speed) mode.

Still further, if it is not possible to otherwise obtain a sufficiently-sized cool air bypass passage, in order that the first embodiment may obtain the same effect as the second embodiment of this invention, the cold air bypass door 29 may be moved higher than the opened position shown in FIG. 2 through FIG. 8C so that when the cold air bypass path 28 is open, so as to constrict the air passing through the core 26b of the heater core 26.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An air conditioner for use in a dual air conditioner type vehicle air-conditioning system including a rear air-conditioning unit at a rear inside of a vehicle compartment along with a front air-conditioning unit at a front inside of the vehicle compartment, the air conditioning comprising:

said rear air-conditioning unit having a case defining an air passage, an intake for suctioning air into the case, a blower for blowing the air suctioned in through the intake into the case, a heating type heat exchanger in the case for heating the air and a foot blow path to blow the hot air heated by the heating type heat exchanger of feet of passengers in a vehicle rear portion;

wherein the case further defines a cool air bypass path to bypass a flow of cool air around the heating type heat exchanger, and further includes a cool air bypass door to be operated and switched between a position where the cool air bypass path fully opens and a position where the cool air bypass path fully closes; and the cool air bypass door is kept in a fully open position to open the cool air bypass path when the blower is set to a low speed mode with hot air being blown out from the foot blow path in a foot mode.

2. The air conditioner of claim 1, further comprising:

a cooling type heat exchanger inside in the case for cooling of air;

wherein the case further defines a face blow path directed to blow air cooled by the cooling type heat exchanger towards faces of passengers in the vehicle rear portion.

3. The air conditioner of claim 2, wherein:

the heating type heat exchanger is for heating air by using hot water from a vehicle engine as a heat source; and the heating type heat exchanger is part of a water valveless hot water circuit for continually circulating hot water during operation of the vehicle engine.

4. The air conditioner of claim 2, wherein:

the cool air bypass door is at a rear side of the heating type heat exchanger; and when the cooling bypass door is set to an open position of the cool air bypass path, a portion of the heating type heat exchanger is blocked by the cool air bypass door.

5. The air conditioner of claim 2, further comprising:

a blow mode door for switching air flow to the face blow path and to the heating type heat exchanger is in a section between the cooling type heat exchanger and the heating type heat exchanger; and an actuator for operating both the blow mode door and the cool air bypass door by way of a link mechanism;

wherein the cooling type heat exchanger is upstream from the heating type heat exchanger inside the case.

6. The air conditioner of claim 5, wherein:

the heating type heat exchanger is for heating air by using hot water from a vehicle engine as a heat source; and the heating type heat exchanger is part of a water valveless hot water circuit for continually circulating hot water during operation of the vehicle engine.

7. The air conditioner of claim 5, wherein:

the cool air bypass door is at a rear side of the heating type heat exchanger; and when the cooling bypass door is set to the open position of the cool air bypass path, a portion of the heating type heat exchanger is blocked by the cool air bypass door.

8. The air conditioner of claim 5, further comprising:

a fan switch for selecting the speed of the blower;

a blow mode switch for switching blow modes using the blow mode door; and a control circuit for receiving signals from the fan switch and blow mode switch for controlling the operation of the actuator.

9. The air conditioner of claim 8, wherein:

the heating type heat exchanger is for heating air by using hot water from a vehicle engine as a heat source; and the heating type heat exchanger is part of a water valveless hot water circuit for continually circulating hot water during operation of the vehicle engine.

10. The air conditioner of claim 8, wherein:

the cool air bypass door is at a rear side of the heating type heat exchanger; and when the cooling bypass door is set to the open position of the cool air bypass path, a portion of the heating type heat exchanger is blocked by the cool air bypass door.

11. The air conditioner of claim 1, wherein:

the heating type heat exchanger is for heating air by using hot water from a vehicle engine as a heat source; and the heating type heat exchanger is part of a water valveless hot water circuit for continually circulating hot water during operation of the vehicle engine.

12. The air conditioner of claim 1, wherein:

the cool air bypass door is at a rear side of the heating type heat exchanger; and when the cooling bypass door is set to the open position of the cool air bypass path, a portion of the heating type heat exchanger is blocked by the cool air bypass door.

13. An air conditioner for use in a dual air conditioner type vehicle system, said air conditioner comprising:

a front air conditioning unit at a front of a vehicle compartment;

a rear air conditioning unit at a rear of the vehicle compartment, said rear air conditioning unit comprising:

a case defining an air passage and an intake for supplying air to said air passage;

a blower for blowing said air through said air passage, said blower having a high speed setting and a low speed setting;

a heating heat exchanger disposed within the case for heating said air;

a foot blow path to blow air heated by said heating heat exchanger to feet of passengers in said rear of the vehicle compartment;

a cool air bypass path defined by said case to bypass a flow of cool air around said heating heat exchanger;

a cool air bypass door movable between a fully open position to pen said cool air bypass path and a closed position to close said bypass path; and a control for said cool air bypass door, said control keeping said cool air bypass door in said closed position when said blower is at said high speed setting, said control keeping said cool air bypass door in said fully open position when said blower is at said low speed setting and said foot blow path is opened.

* * * * *